United States Patent
Kitahara et al.

(10) Patent No.: US 11,111,887 B2
(45) Date of Patent: Sep. 7, 2021

(54) ABSOLUTE HUMIDITY SENSOR

(71) Applicant: DENSO CORPORATION, Kariya (JP)

(72) Inventors: Noboru Kitahara, Kariya (JP); Hajime Mashita, Kariya (JP); Takashi Ooga, Kariya (JP); Teruaki Kaifu, Kariya (JP)

(73) Assignee: DENSO CORPORATION, Kariya (JP)

( * ) Notice: Subject to any disclaimer, the term of this patent is extended or adjusted under 35 U.S.C. 154(b) by 252 days.

(21) Appl. No.: 16/512,831

(22) Filed: Jul. 16, 2019

(65) Prior Publication Data
US 2019/0338733 A1 Nov. 7, 2019

Related U.S. Application Data

(63) Continuation of application No. PCT/JP2018/000918, filed on Jan. 16, 2018.

(30) Foreign Application Priority Data

Feb. 8, 2017 (JP) .............................. JP2017-021504

(51) Int. Cl.
*F02M 26/46* (2016.01)
*F02M 26/47* (2016.01)
(Continued)

(52) U.S. Cl.
CPC ............ *F02M 26/46* (2016.02); *F02M 26/47* (2016.02); *G01F 1/68* (2013.01); *G01N 27/00* (2013.01); *F02M 2026/003* (2016.02)

(58) Field of Classification Search
CPC .. F02M 26/46; F02M 26/47; F02M 2026/003; G01F 1/68; G01F 15/043;
(Continued)

(56) References Cited

U.S. PATENT DOCUMENTS

| 8,468,883 B2* | 6/2013 | Sakuma | G01F 1/6965 73/204.26 |
| 9,869,573 B2* | 1/2018 | Kawai | G01F 15/046 |

(Continued)

FOREIGN PATENT DOCUMENTS

| DE | 10164911 | 7/2007 |
| JP | 2010-223179 | 10/2010 |

(Continued)

OTHER PUBLICATIONS

U.S. Appl. No. 16/512,797 of Kitahara et al., filed Jul. 16, 2019 (44 pages).

*Primary Examiner* — Freddie Kirkland, III
(74) *Attorney, Agent, or Firm* — Nixon & Vanderhye P.C.

(57) ABSTRACT

A temperature sensor differs from a relative humidity sensor in responsiveness when the temperature of air changes. An absolute humidity acquisition unit acquires absolute humidity of air from outputs from the temperature sensor and the relative humidity sensor. A delay adjustment unit is to delay an output from one of the temperature sensor and the relative humidity sensor, which is a high response sensor having a higher responsiveness, and to reconcile change-behaviors of the output from the temperature sensor and the output from the relative humidity sensor in response to a temperature change in air. The absolute humidity acquisition unit acquires the absolute humidity based on the output from the other of the temperature sensor and the relative humidity sensor, which is a low response sensor having a lower responsiveness, and the sensor signal, which is from the high response sensor and delayed in the delay adjustment unit.

7 Claims, 11 Drawing Sheets

(51) Int. Cl.
*G01F 1/68* (2006.01)
*G01N 27/00* (2006.01)
*F02M 26/00* (2016.01)

(58) Field of Classification Search
CPC ......... G01F 1/6965; G01F 5/00; G01N 27/00; F02D 21/08; F02D 45/00
See application file for complete search history.

(56) References Cited

U.S. PATENT DOCUMENTS

| | | | |
|---|---|---|---|
| 9,958,305 B2* | 5/2018 | Nakano | G01F 1/6842 |
| 9,970,396 B2* | 5/2018 | Hoshika | G01M 15/042 |
| 10,344,697 B2* | 7/2019 | Ito | F02D 41/1479 |
| 10,429,223 B2* | 10/2019 | Ban | F02D 41/18 |
| 2003/0034443 A1* | 2/2003 | Kouznetsov | D06F 58/30 |
| | | | 250/222.2 |
| 2011/0107832 A1 | 5/2011 | Sakuma | |
| 2012/0085324 A1 | 4/2012 | Saito et al. | |
| 2013/0269419 A1 | 10/2013 | Etherington et al. | |
| 2016/0202200 A1* | 7/2016 | Nakano | G01F 1/6845 |
| | | | 73/23.31 |
| 2017/0016415 A1* | 1/2017 | Hoshika | F02M 35/10393 |
| 2017/0059381 A1* | 3/2017 | Ban | G01F 1/696 |
| 2019/0338737 A1* | 11/2019 | Kitahara | F02M 35/10393 |

FOREIGN PATENT DOCUMENTS

| | | |
|---|---|---|
| JP | 2013-113778 | 6/2013 |
| JP | 2014-38056 | 2/2014 |
| JP | 2014-92430 | 5/2014 |
| JP | 2015-90338 | 5/2015 |
| JP | 2015-194440 | 11/2015 |
| JP | 2016-31341 | 3/2016 |
| JP | 2016-109625 | 6/2016 |
| WO | 2018/147005 | 8/2018 |

* cited by examiner

UPSTREAM ←→ DOWNSTREAM

FIG. 17

|  | TEMPERATURE | | FLOW RATE | |
|---|---|---|---|---|
|  | LOW | HIGH | LOW | HIGH |
| TEMPERATURE SENSING PORTION | – | – | SLOW | FAST |
| HUMIDITY SENSING PORTION | SLOW | FAST | SLOW | FAST |

…
ABSOLUTE HUMIDITY SENSOR

CROSS REFERENCE TO RELATED APPLICATION

The present application is a continuation application of International Patent Application No. PCT/JP2018/000918 filed on Jan. 16, 2018, which designated the U.S. and claims the benefit of priority from Japanese Patent Application No. 2017-21504 filed on Feb. 8, 2017. The entire disclosures of all of the above applications are incorporated herein by reference.

TECHNICAL FIELD

The present disclosure relates to an absolute humidity sensor that detects the absolute humidity in air.

BACKGROUND

Conventionally, an absolute humidity sensor has been used to detect an absolute humidity in air based on relative humidity information and temperature information output from a humidity sensor.

SUMMARY

According to an aspect of the present disclosure, an absolute humidity sensor is placed in an environment allowing air to flow. The absolute humidity sensor includes a temperature signal and a relative humidity sensor having responsivenesses and configured to acquire an absolute humidity based on signals from the sensors.

BRIEF DESCRIPTION OF THE DRAWINGS

The above and other objects, features and advantages of the present disclosure will become more apparent from the following detailed description made with reference to the accompanying drawings. In the drawings:

FIG. 17 is a table illustrating the responsiveness of a temperature sensor and a relative humidity sensor according to the fourth embodiment in terms of the temperature and the flow rate.

DETAILED DISCLOSURE

Figure 1:
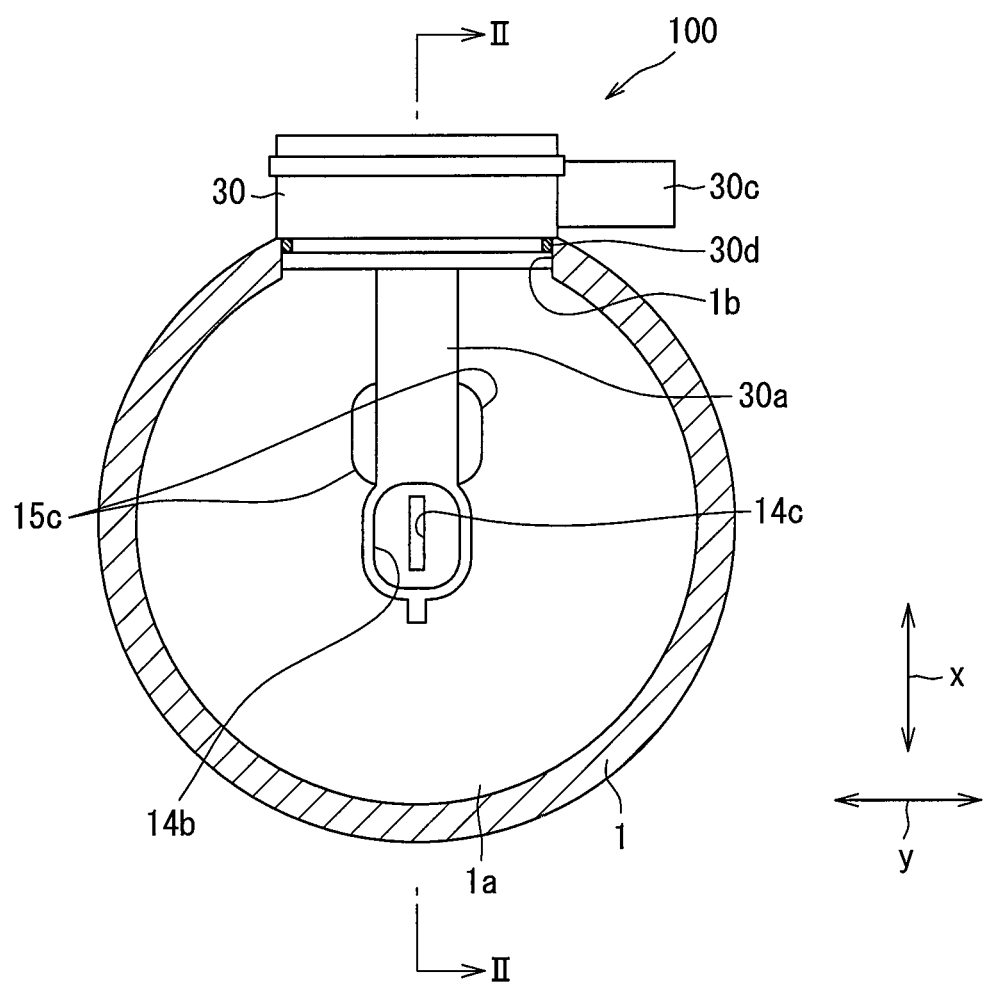
FIG. 1 is a front view illustrating a state of mounting an airflow meter according to a first embodiment.

To begin with, technical issues will be discussed as follows.

A physical quantity detection apparatus may be employed to detect a physical quantity such as a humidity. For example, an absolute humidity sensor is configured to detect an absolute humidity in air. An absolute humidity sensor having a conceivable configuration calculates an absolute humidity based on relative humidity information output from a relative humidity sensor and temperature information output from a temperature sensor.

In an assumable configuration, the relative humidity sensor configured to output the humidity information may differ from the temperature sensor configured to output the temperature information in the responsiveness when air temperature changes. In this case, the relative humidity sensor differs from the temperature sensor in change-behavior of output in response to a change in air temperature. As the humidity sensor differs from the temperature sensor in the responsiveness, the sensors may be incapable of using a state of air at the same temperature when air temperature changes. In other words, as the humidity sensor differs from the temperature sensor in the responsiveness, the sensors may output sensor signals corresponding to different temperatures of air timewise caused by the difference in the responsiveness. Consequently, the humidity sensor and the temperature sensor cannot detect air in the same state when the state of air changes. Thus, a spike-like error would occur in the absolute humidity that is calculated based on the temperature information and the relative humidity information when air temperature changes.

According to an aspect of the present disclosure, an absolute humidity sensor comprises a temperature sensor placed in an environment allowing air to flow and configured to output a temperature signal as a sensor signal corresponding to a temperature of air. The absolute humidity sensor further comprises a relative humidity sensor placed in the environment and configured to output a relative humidity signal as a sensor signal corresponding to relative humidity of air. The absolute humidity sensor further comprises an absolute humidity acquisition unit configured to acquire absolute humidity of air from the temperature signal and the relative humidity signal. The temperature sensor differs from the relative humidity sensor in responsiveness when the temperature of air changes. The absolute humidity sensor further comprises a delay adjustment unit configured to delay an output from one of the temperature sensor and the relative humidity sensor, which is a high response sensor having the higher responsiveness, and to reconcile change-behaviors of the output from the temperature sensor and the output from the relative humidity sensor in response to a temperature change in air. The absolute humidity acquisition unit is configured to acquire the absolute humidity based on the sensor signal from an other of the temperature sensor and the relative humidity sensor, which is a low response sensor having a lower responsiveness, and the sensor signal, which is from the high response sensor and delayed in the delay adjustment unit.

The present aspect acquires the absolute humidity of air from a temperature signal and a relative humidity signal output from the temperature sensor and the relative humidity sensor differing in the responsiveness when the air temperature changes. The present aspect includes the delay adjustment unit that delays output from one of the temperature sensor and the relative humidity sensor as a high response sensor having the higher responsiveness and reconciles change-behaviors of output from the temperature sensor and the relative humidity sensor in response to a condition change in air. The present aspect acquires the absolute humidity based on a sensor signal from the low response sensor and a sensor signal that is output from the high response sensor and is delayed in the delay adjustment unit. This makes it possible to reconcile change-behaviors of output from the temperature sensor and the relative humidity sensor in response to a condition change in air. Therefore, the present aspect can suppress an error in the absolute humidity when the air condition changes.

In order to achieve the above object, according to another aspect of the present disclosure, an absolute humidity sensor comprises a temperature sensor placed in an environment allowing air to flow and configured to output a temperature signal as a sensor signal corresponding to a temperature of air. The absolute humidity sensor further comprises a relative humidity sensor placed in the environment and configured to output a relative humidity signal as a sensor signal corresponding to relative humidity of air. The absolute humidity sensor further comprises an absolute humidity acquisition unit configured to acquire absolute humidity of air from the temperature signal and the relative humidity signal. The temperature sensor differs from the relative humidity sensor in responsiveness when the temperature of air changes. The absolute humidity sensor further comprises an advance adjustment unit configured to advance an output from one of the temperature sensor and the relative humidity sensor, which is a low response sensor having a lower responsiveness, and to reconcile change-behaviors of the output from the temperature sensor and the output from the relative humidity sensor in response to a temperature change in air. The absolute humidity acquisition unit is configured to acquire the absolute humidity based on the sensor signal from an other of the temperature sensor and the relative humidity sensor, which is a high response sensor having a higher responsiveness, and the sensor signal, which is from the low response sensor and advanced in the advance adjustment unit.

The present aspect acquires the absolute humidity of air from a temperature signal and a relative humidity signal output from the temperature sensor and the relative humidity sensor differing in the responsiveness when the air temperature changes. The present aspect includes an advance adjustment unit that advances output from one of the temperature sensor and the relative humidity sensor as a low response sensor having the lower responsiveness and reconciles change-behaviors of output from the temperature sensor and the relative humidity sensor in response to a condition change in air. The present aspect acquires the absolute humidity based on a sensor signal from the high response sensor and a sensor signal that is output from the low response sensor and is advanced in the advance adjustment unit. This makes it possible to reconcile change-behaviors of output from the temperature sensor and the relative humidity sensor in response to a condition change in air. Therefore, the present aspect can suppress an error in the absolute humidity when the air condition changes.

The description below explains a plurality of embodiments of the present disclosure with reference to the accompanying drawings. In each embodiment, the same parts or components corresponding to the preceding embodiment are depicted by the same reference symbols and duplicate description may be omitted for simplicity. When only part of a configuration is described in each embodiment, the remaining part of the configuration can reference and apply the preceding embodiment already described. Similarly, step numbers can reference and apply the other preceding embodiments already described.

First Embodiment

The present embodiment uses an example of applying the present disclosure to an airflow meter 100. The airflow meter 100 includes an absolute humidity sensor. However, the present disclosure is not limited thereto. For example, the present disclosure may not be mounted on the airflow meter 100. The present disclosure may not be placed in an environment where intake air (to be described later) flows.

Figure 2:
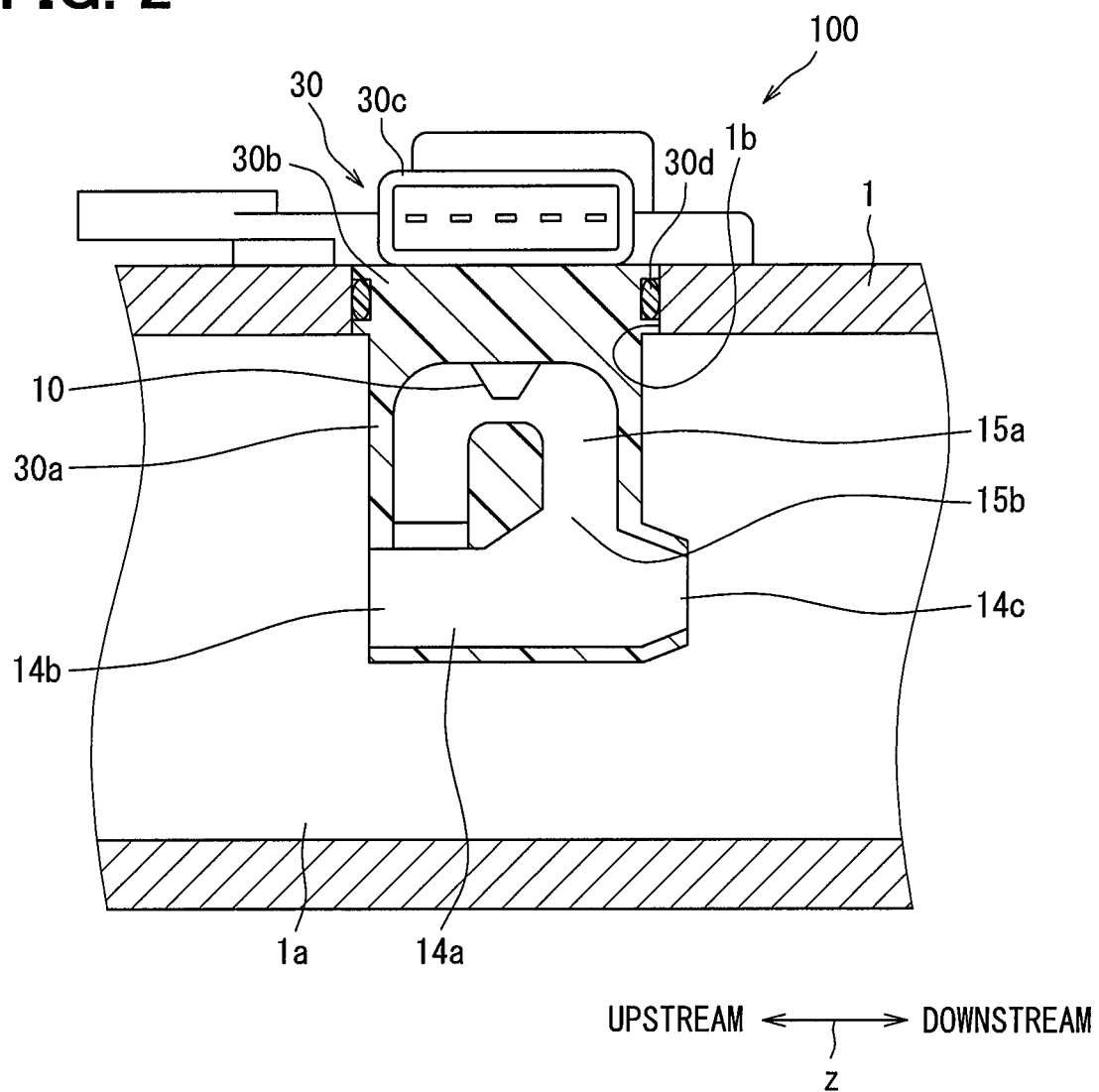
FIG. 2 is a cross-sectional view taken along the line II-II of FIG. 1.

The airflow meter 100 is mounted on a vehicle equipped with an internal combustion engine (hereinafter referred to as an engine) and has a thermal airflow volume measurement function that measures a flow volume of intake air taken into an engine cylinder. As illustrated in FIGS. 1 and 2, the airflow meter 100 outputs a sensor signal corresponding to the relative humidity and the temperature and in addition to a sensor signal corresponding to the flow volume of intake air flowing in a duct 1, and acquires the absolute humidity based on the relative humidity and the temperature. The airflow meter 100 is capable of outputting the sensor signal and a signal (hereinafter referred to as an absolute humidity signal) representing the absolute humidity to an ECU 60 as an external apparatus. The duct 1 in FIGS. 1 and 2 provides cross-sectional views of the duct 1.

The present embodiment uses the ECU 60 as an example of the external apparatus. The ECU 60 is provided separately from the airflow meter 100 and is electrically connected to the airflow meter 100. The ECU 60 is an abbreviation for an Electronic Control Unit and is provided with a microcomputer including a CPU, a memory including ROM and RAM, an input portion, an output portion, and a power supply circuit. The ECU 60 performs specified control by using a sensor signal output from the airflow meter 100. The airflow meter 100 may be electrically connected to an external apparatus except the ECU 60 and may be capable of outputting sensor signals to the external apparatus.

With reference to FIGS. 1 through 4, the description below explains the configuration of the airflow meter 100. The airflow meter 100 includes a sensor portion 10, a response delay processing unit 21a, an absolute humidity calculation unit 22, a housing 30, a pressure sensor 40, and a circuit chip 50.

As illustrated in FIGS. 1 and 2, the airflow meter 100 is detachably mounted on the duct 1 such as an intake air tube (intake air duct) or an outlet duct of an air cleaner while the housing 30 is provided with the sensor portion 10. The airflow meter 100 is inserted into a sensor insertion hole 1b formed in a wall of the duct 1 so that the airflow meter 100 is partially placed in a main flow channel 1a in the duct 1.

While mounted on the duct 1, the airflow meter 100 allows the sensor portion 10 to be partially placed in an environment where the intake air flows. Specifically, the airflow meter 100 allows at least a flow volume sensing portion 11, a relative humidity sensing portion 12b, and a temperature sensing portion 12c as parts of the sensor portion 10 to be exposed to the intake air. According to the present embodiment, the environment allowing the air to flow signifies an environment allowing the intake air to flow in an engine. The description below represents the relative humidity sensing portion 12b simply as the humidity sensing portion 12b.

As illustrated in FIG. 2, the housing 30 is integrally provided with the sensor portion 10. The housing 30 is also integrally provided with the pressure sensor 40 and the circuit chip 50 as well as the sensor portion 10.

As illustrated in FIGS. 1 and 2, the housing 30 includes a bypass portion 30a, an engaging portion 30b, and a connector portion 30c, for example.

The bypass portion 30a forms a bypass flow channel 14a and a sub-bypass flow channel 15a where the intake air flowing through the main flow channel 1a partially passes. The bypass flow channel 14a is provided between a bypass flow channel entry 14b and a bypass flow channel exit 14c. The intake air flowing through the bypass flow channel 14a partially flows into the sub-bypass flow channel 15a from a sub-bypass flow channel entry 15b. The sub-bypass flow channel 15a is provided between the sub-bypass flow channel entry 15b and a sub-bypass flow channel exit 15c.

The engaging portion 30b engages with the sensor insertion hole 1b of the duct 1 via an O-ring 30d. The connector portion 30c surrounds a terminal that makes electrical connection with ECU 60. The airflow meter 100 can thereby output a sensor signal and an absolute humidity signal to the ECU 60 via the connector portion 30c.

The housing 30 can be embodied by referencing the housing described in JP 2014-92430 A, for example. The airflow meter 100 may be capable of communicating sensor signals with the ECU 60 while there has been described the example where the airflow meter 100 can electrically connect with the ECU 60 via the terminal. Therefore, the airflow meter 100 may be capable of wireless communication with the ECU 60.

Figure 3:
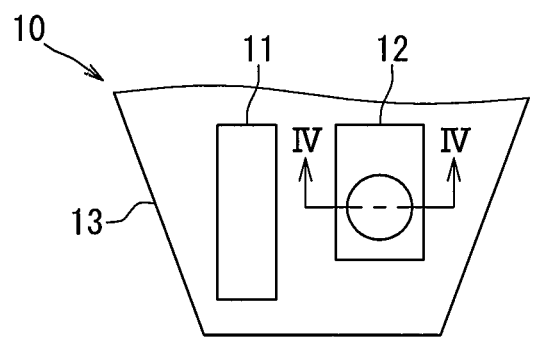
FIG. 3 is a front view illustrating a schematic configuration of a sensor portion according to the first embodiment.

As illustrated in FIG. 3, the sensor portion 10 includes the flow volume sensing portion 11 and the temperature-humidity sensing portion 12 integrally formed on a sensor substrate 13, for example. As will be described later, the temperature-humidity sensing portion 12 includes a humidity sensing portion 12b and the temperature sensing portion 12c that are integrally formed. The airflow meter 100 may be provided as an integrated subassembly of three sensors such as the flow volume sensing portion 11, the humidity sensing portion 12b, and the temperature sensing portion 12c. The airflow meter 100 can thereby reduce the number of parts and the number of installation procedures. The airflow meter 100 can detect the intake air at the same location, making it possible to decrease differences in the responsiveness of the sensing portions 11, 12b, and 12c. Consequently, the airflow meter 100 can perform highly accurate correction by using the sensor signals.

The flow volume sensing portion 11 is placed in the sub-bypass flow channel 15a while the housing 30 is mounted on the duct 1. The flow volume sensing portion 11 outputs a flow volume signal to the circuit chip 50. The flow volume signal is a sensor signal corresponding to the flow volume of the intake air flowing in the sub-bypass flow channel 15a. In other words, the flow volume sensing portion 11 detects the flow volume of the intake air.

The circuit chip 50 is electrically connected to a terminal of the connector portion 30c. The airflow meter 100 can thereby output the flow volume signal to the ECU 60. The flow volume sensing portion 11 can be embodied by referencing the flow volume sensor described in JP 2015-90338 A, for example.

Figure 4:
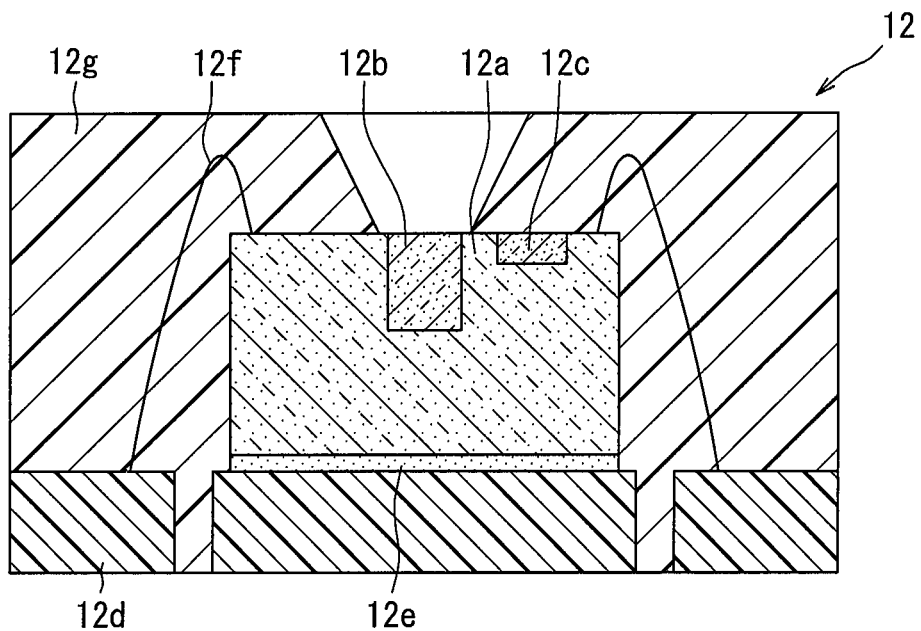
FIG. 4 is a cross-sectional view taken along the line IV-IV of FIG. 3.

The temperature-humidity sensing portion 12 is placed in the sub-bypass flow channel 15a while the housing 30 is mounted on the duct 1. As illustrated in FIG. 4, the temperature-humidity sensing portion 12 includes a substrate 12a, an electrode 12d, a bonding material 12e, a wire 12f, and a sealing portion 12g, for example.

The substrate 12a is available as a semiconductor substrate, for example, and includes the humidity sensing portion 12b and the temperature sensing portion 12c. The humidity sensing portion 12b is comparable to a "relative humidity sensor." The temperature sensing portion 12c is comparable to a "temperature sensor."

The humidity sensing portion 12b includes a humidity sensitive film, for example, and outputs a relative humidity signal to the circuit chip 50. The relative humidity signal is a sensor signal corresponding to the relative humidity of the intake air flowing through the sub-bypass flow channel 15a. In other words, the humidity sensing portion 12b detects the relative humidity of the intake air. The temperature sensing portion 12c outputs a temperature signal to the circuit chip 50. The temperature signal is a sensor signal corresponding to the intake air flowing through the sub-bypass flow channel 15a. In other words, the temperature sensing portion 12c detects the temperature of the intake air.

The sensor portion 10 may include a processing circuit that processes an electric signal output from the humidity sensing portion 12b and outputs a relative humidity signal. Similarly, the sensor portion 10 may include a processing circuit that processes an electric signal output from the temperature sensing portion 12c and outputs a temperature signal.

The temperature sensing portion 12c can detect the temperature at the same place as the place where the humidity sensing portion 12b detects the humidity. In other words, the humidity sensing portion 12b and the temperature sensing portion 12c are provided adjacently to each other or in the vicinity. The humidity sensing portion 12b and the temperature sensing portion 12c may be provided at positions fully close enough to cause no temperature difference in the intake air. The temperature-humidity sensing portion 12 may be provided as a humidity sensor having a temperature detection function.

The substrate 12a is bonded to a base via the bonding material 12e. The base is available as a die pad in a lead frame including the electrode 12d.

The substrate 12a includes an electrode electrically connected to each of the humidity sensing portion 12b and the temperature sensing portion 12c. A part of the wire 12f is electrically connected to the electrode. Another part of the wire 12f is electrically connected to the electrode 12d. In the substrate 12a, the humidity sensing portion 12b and the temperature sensing portion 12c are each electrically connected to the electrode d via the wire 12f.

While partially exposing the humidity sensing portion 12b and the electrode 12d, the sealing portion 12g adheres tightly to the other constituent elements of the temperature-humidity sensing portion 12 and covers the other constituent elements. The sealing portion 12g protects the constituent elements of the temperature-humidity sensing portion 12. The temperature-humidity sensing portion 12 is electrically connected to the circuit chip 50 via wiring at a part exposed from the sealing portion 12g in the electrode 12d.

The present disclosure is not limited thereto. According to the present disclosure, the humidity sensing portion 12b and the temperature sensing portion 12c may be placed in an environment where the intake air flows. The humidity sensing portion 12b and the temperature sensing portion 12c may be placed in the bypass flow channel 14a or the main flow channel 1a.

The temperature sensing portion 12c and the humidity sensing portion 12b are considered to differ in the responsiveness. The responsiveness of the temperature sensing portion 12c depends on the heat capacity or heat conduction of the temperature sensing portion 12c or heat transmission from a support member such as the substrate 12a or the sensor substrate 13. The responsiveness of the humidity sensing portion 12b depends on a diffusion speed, a diffusion region, or a surface area of the humidity sensitive film. The responsiveness here may signify the temperature responsiveness or the amount of delay in output.

The responsiveness is determined according to difference T between the timing to change the temperature or humidity of air containing a specified temperature or humidity and the output timing to output a temperature signal or a relative humidity signal representing changes comparable to those in the temperature or humidity in the air from the temperature sensing portion 12c or the humidity sensing portion 12b. When difference T for the temperature sensing portion 12c is larger than that for the humidity sensing portion 12b, the temperature sensing portion 12c is less responsive than the humidity sensing portion 12b.

For example, when the temperature sensor has large heat capacity and the terminal as a conduction portion of the temperature sensor causes large heat conduction to anything other than the air, the temperature sensor itself indicates a slow temperature change. When the humidity sensor uses a heat-sensitive film capable of a high diffusion speed and the diffusion region is small, the humidity sensor is less responsive. A combination of the temperature sensor and the humidity sensor causes a response difference.

Different requirements or restrictions determine the responsiveness of the temperature sensing portion 12c and the humidity sensing portion 12b. It is difficult to ensure the same responsiveness even if the temperature sensing portion 12c and the humidity sensing portion 12b are adjacently provided for the same substrate 12a. The temperature sensing portion 12c and the humidity sensing portion 12b detect different physical quantities. It is also difficult to ensure the same responsiveness based on hardware configurations.

The present embodiment uses the example where the temperature sensing portion 12c is more responsive than the humidity sensing portion 12b. According to the present embodiment, the temperature sensing portion 12c may be defined as a high response sensor and the humidity sensing portion 12b may be defined as a low response sensor. In other words, the high response sensor is more responsive than the low response sensor. The low response sensor is less responsive than the high response sensor.

In this case, there is a difference in change-behaviors of output from the temperature sensing portion 12c and the humidity sensing portion 12b in response to a temperature change in the air. Different responsivenesses characterize the temperature sensing portion 12c and the humidity sensing portion 12b. A change in the air temperature can be assumed to be a state where the same-temperature air cannot be used as a detection target. Therefore, a spike-like error occurs in the absolute humidity calculated based on a temperature signal and a relative humidity signal available when the air temperature changes.

Figure 5:
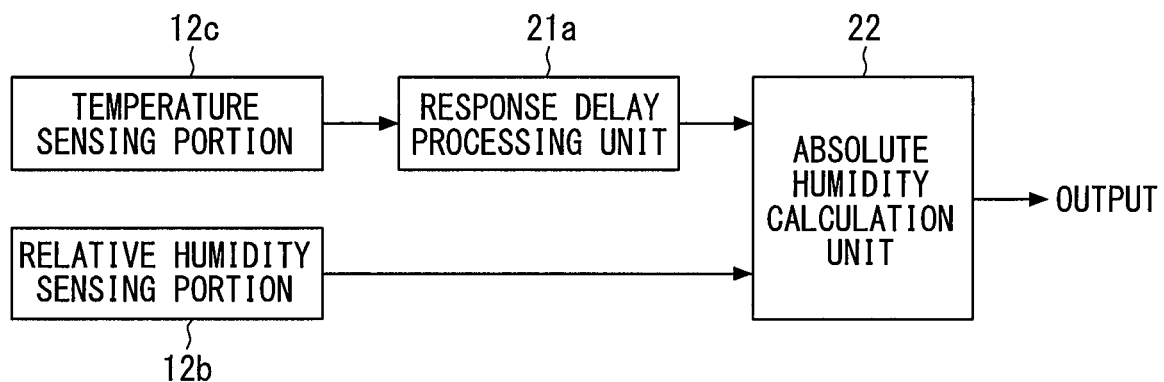
FIG. 5 is a block diagram illustrating a schematic configuration of the airflow meter according to the first embodiment.
Figure 8:
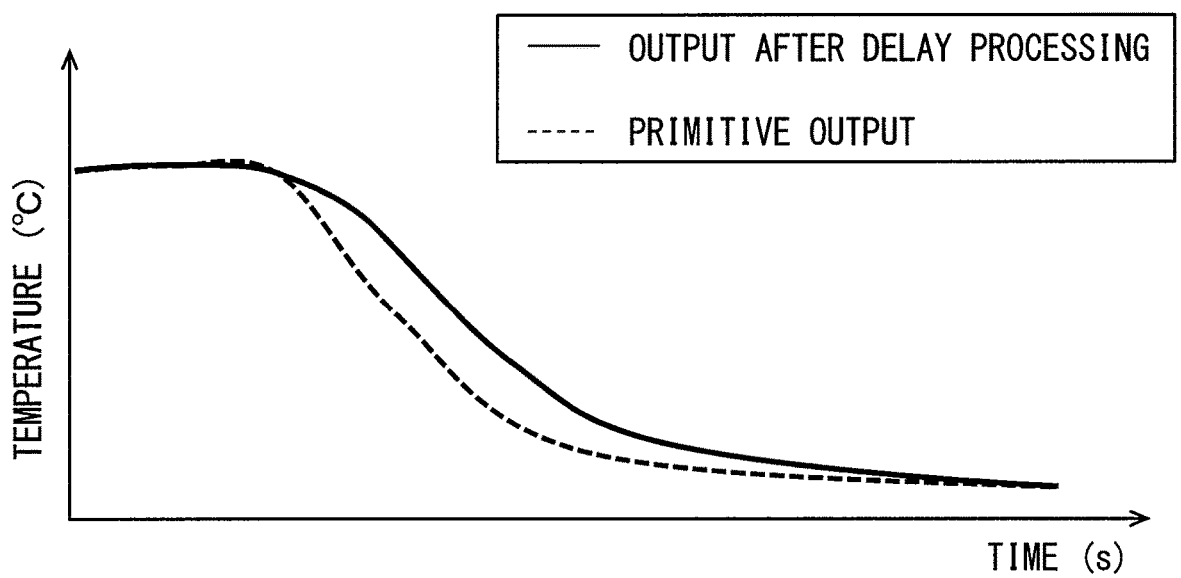
FIG. 8 is a graph illustrating output characteristics before and after a delay processing according to the first embodiment.

The airflow meter 100 includes the response delay processing unit 21a in order to suppress an error in the absolute humidity. The response delay processing unit 21a is comparable to a "delay adjustment unit" and is supplied with a sensor signal from the temperature sensing portion 12c as illustrated in FIG. 5. The response delay processing unit 21a delays output from the temperature sensing portion 12c as illustrated in FIG. 8. In FIG. 8, PRIMITIVE OUTPUT signifies output from the temperature sensing portion 12c without using the response delay processing unit 21a. OUTPUT AFTER DELAY PROCESSING signifies output from the temperature sensing portion 12c delayed by the response delay processing unit 21a.

As above, the response delay processing unit 21a reconciles change-behaviors of output from the temperature sensing portion 12c and the humidity sensing portion 12b in response to a temperature change in the intake air. Namely, the response delay processing unit 21a delays the output timing of the high response temperature sensing portion 12c, making it possible to reconcile output behaviors of the temperature sensing portion 12c and the humidity sensing portion 12b. Reconciling output behaviors of the two sensors may signify reconciling the responsiveness of the two sensors.

When the intake air temperature changes, the temperature sensing portion 12c can ensure the state of using the same-temperature intake air as a detection target even if the temperature sensing portion 12c is more responsive than the humidity sensing portion 12b.

It is possible to predetermine a degree of delaying output for the response delay processing unit 21a. To do this, an experiment or a simulation is performed to confirm a difference between the temperature sensing portion 12c and the humidity sensing portion 12b in change-behaviors of output in response to a temperature change in the intake air. The response delay processing unit 21a may delay the output by using the software or an RC filter.

The response delay processing unit 21a may be provided for the temperature sensing portion 12c or the circuit chip 50. The response delay processing unit 21a may be provided between the temperature sensing portion 12c and the circuit chip 50. The airflow meter 100 just needs to have the function that delays output from a high response sensor and reconciles change-behaviors of output from the temperature sensing portion 12c and the humidity sensing portion 12b in response to a temperature change in the intake air.

As illustrated in FIG. 5, the absolute humidity calculation unit 22 is supplied with a temperature signal from the temperature sensing portion 12c via the response delay processing unit 21a and is supplied with a humidity signal from the humidity sensing portion 12b without using the response delay processing unit 21a. The absolute humidity calculation unit 22 acquires the absolute humidity of the intake air from the temperature signal and the relative humidity signal. Namely, the absolute humidity calculation unit 22 acquires the absolute humidity from a sensor signal from the humidity sensing portion 12b as a low response sensor and a sensor signal from the temperature sensing portion 12c as a high response sensor while this sensor signal is delayed in the response delay processing unit 21a.

The absolute humidity calculation unit 22 can acquire the absolute humidity of the intake air by performing operations according to predetermined arithmetic equations using the temperature signal and the relative humidity signal.

For example, the absolute humidity needed for engine control is a specific humidity equal to a mixing ratio and is found by using the equation of mixing ratio r=mw/mg=A× e/P−e. Symbol mw denotes the mass of vapor contained in the air. Symbol mg denotes the mass of dry gas other than the vapor. Symbol A denotes a ratio between the molecular weight of vapor and the molecular weight of dry gas. Regarding the air, for example, the ratio is 18.016/ 28.966≈0.622. Symbol P denotes the total pressure of a gas. Symbol e denotes the steam pressure that is calculated as e=H (relative humidity)×es (saturated steam pressure).

However, the absolute humidity calculation unit 22 may acquire the absolute humidity from a temperature signal, a relative humidity signal, and an absolute humidity map. The absolute humidity map provides the association among a humidity signal, a temperature signal, and absolute humidity.

The present embodiment uses the example where the absolute humidity calculation unit 22 is provided for the circuit chip 50. Namely, the circuit chip 50 includes the absolute humidity calculation unit 22 as a function block. The circuit chip 50 can be assumed to include a function to calculate the absolute humidity.

Figure 6:
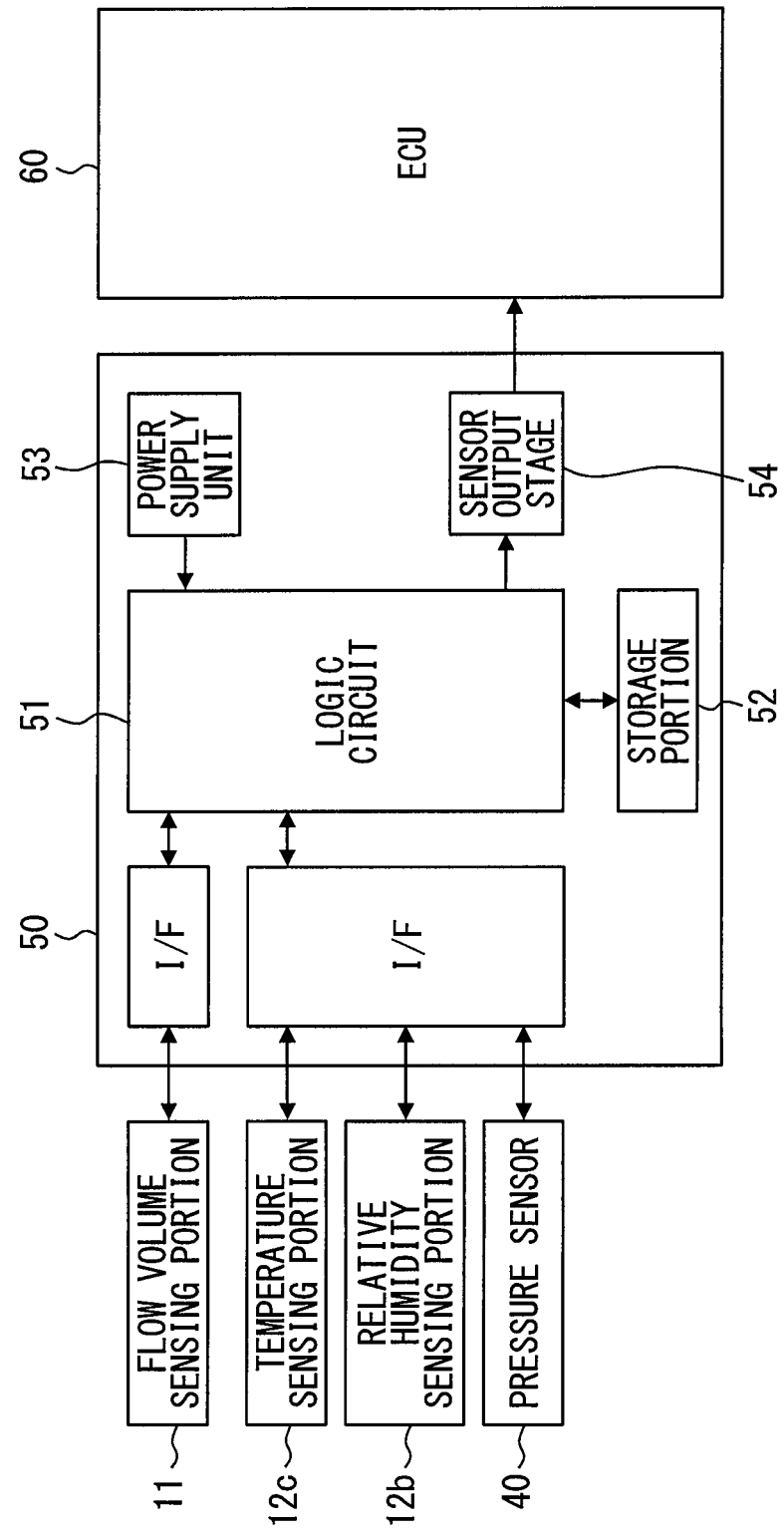
FIG. 6 is a block diagram illustrating a schematic configuration of a system including the airflow meter according to the first embodiment.

As illustrated in FIG. 6, the circuit chip 50 includes I/F to accept sensor signals from the sensing portions, a logic circuit 51, a storage portion 52, a power supply unit 53, and a sensor output stage 54. In the circuit chip 50, the logic circuit 51 operates on the power supplied from the power supply unit 53 and calculates the absolute humidity based on sensor signals from the sensors and the contents stored in the storage portion 52. The circuit chip 50 outputs the calculated absolute humidity to the ECU 60 via the sensor output stage 54. The sensor output stage 54 is available as SENT (Single Edge Nibble Transmission).

However, the present disclosure is not limited thereto. According to the present disclosure, the circuit chip 50 may output sensor signals supplied from the sensors to the ECU 60 via the sensor output stage 54 so that the ECU 60 acquires the absolute humidity. The ECU 60 may include an absolute humidity acquisition unit. In this case, the present disclosure may be assumed to include part of the ECU 60 (the absolute humidity calculation unit).

The ECU 60 can acquire a flow volume signal output from the flow volume sensing portion 11 and the absolute humidity calculated in the absolute humidity calculation unit 22. The flow volume sensing portion 11 is assumed to have humidity characteristics that allow output to vary with the absolute humidity. In this case, the ECU 60 may include a correction portion that corrects a flow volume signal by using the absolute humidity. The ECU 60 corrects the flow volume signal to a small extent corresponding to the high absolute humidity and corrects the flow volume signal to a large extent corresponding to the low absolute humidity. The ECU 60 can improve the accuracy of a flow volume signal output from the flow volume sensing portion 11 regardless of the absolute humidity of the intake air. In this case, the present disclosure is assumed to include part of the ECU 60 (the correction portion). The airflow meter 100 may include a component that performs this correction.

The pressure sensor 40 outputs a pressure signal as a sensor signal corresponding to a pressure of the duct 1. Therefore, the pressure sensor 40 is assumed to detect the pressure of the duct 1. The present embodiment uses the example where the airflow meter 100 includes the pressure sensor 40. However, the present disclosure is not limited thereto. The airflow meter 100 may not include the pressure sensor 40.

The description below explains an effect of the airflow meter 100 by using an absolute humidity sensor as a comparative example. The absolute humidity sensor according to the comparative example differs from the airflow meter 100 in that the response delay processing unit 21a is not included.

Figure 9:
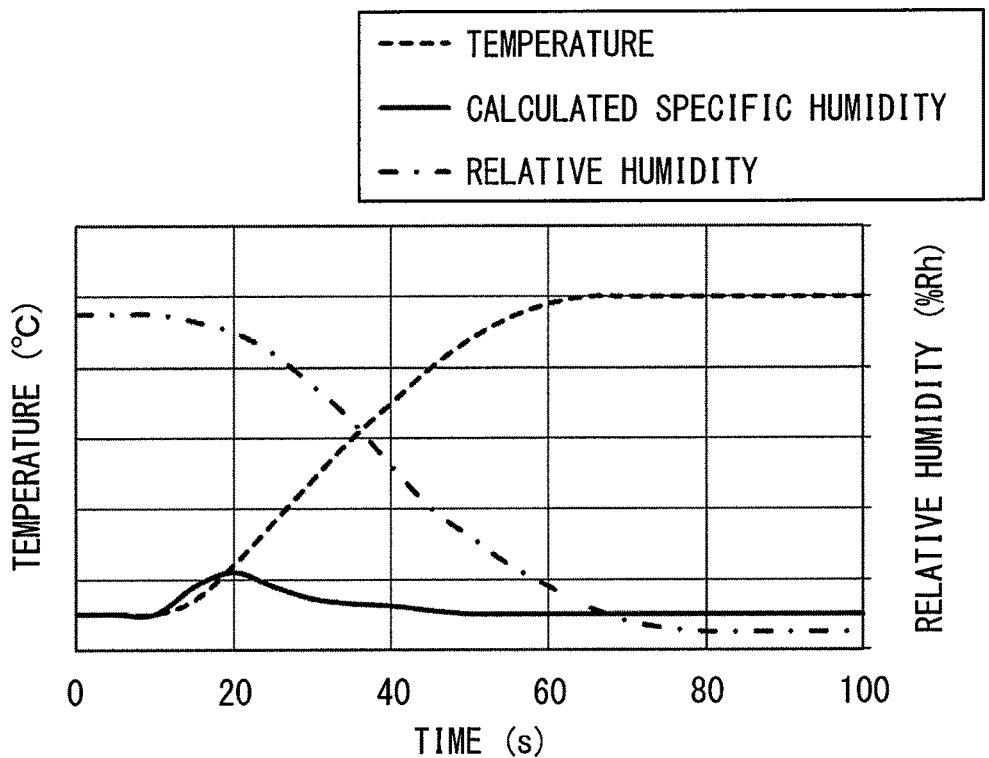
FIG. 9 is a graph illustrating output characteristics of an airflow meter according to a comparative example.

Similarly to the airflow meter 100, the absolute humidity sensor according to the comparative example acquires the absolute humidity in the air from a temperature signal and a relative humidity signal output from the humidity sensing portion 12b and the temperature sensing portion 12c provided for the same substrate 12a. As illustrated in FIG. 9, therefore, the absolute humidity sensor according to the comparative example is subject to a difference in change-behaviors of output from the temperature sensing portion 12c and the humidity sensing portion 12b in response to a temperature change in the intake air. Around 10 to 30 seconds in FIG. 9, a spike-like error occurs in the absolute humidity calculated by the absolute humidity sensor according to the comparative example.

Normally, the temperature sensing portion 12c is supposed to be more responsive to the temperature than the humidity sensing portion 12b. In this case, an increase in the intake air temperature causes a value of the amount of saturated vapor calculated from an output from the temperature sensing portion 12c to be larger than a value of the amount of saturated vapor sensed by the humidity sensing portion 12b. This increases the absolute humidity calculated by using the amount of saturated vapor calculated from a sensor signal of the temperature sensing portion 12c. This state occurs when the intake air temperature changes, causing a spike-like error.

Figure 7:
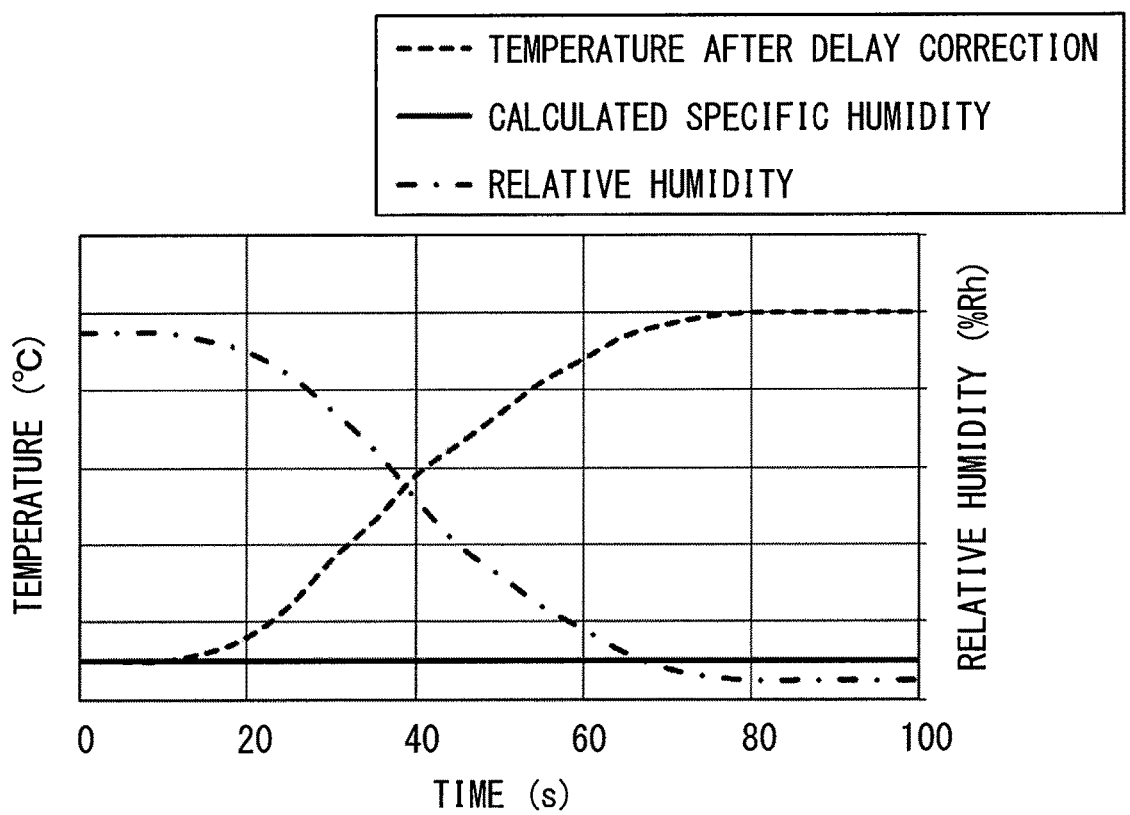
FIG. 7 is a graph illustrating output characteristics of the airflow meter according to the first embodiment.

The airflow meter 100 includes the response delay processing unit 21a that delays an output from the more responsive temperature sensing portion 12c and reconciles change-behaviors of output from the temperature sensing portion 12c and the humidity sensing portion 12b in response to a temperature change in the intake air. The airflow meter 100 acquires the absolute humidity from a sensor signal from the humidity sensing portion 12b and a sensor signal that is generated from the temperature sensing portion 12c and is delayed in the response delay processing unit 21a. As illustrated in FIG. 7, the airflow meter 100 can, therefore, reconcile change-behaviors of output from the temperature sensing portion 12c and the humidity sensing portion 12b in response to a temperature change in the intake air. As illustrated in FIG. 7, the airflow meter 100 can suppress an error in the absolute humidity when the temperature changes in the intake air. In other words, the airflow meter 100 can improve the accuracy of the absolute humidity in a transient state.

In terms of the sensor signal from the humidity sensing portion 12b, the object of the present disclosure is to reconcile change-behaviors of output from the high response sensor and the low response sensor in response to a state change in the air. In this case, the sensor signal from the humidity sensing portion 12b as the low response sensor may undergo at least one of the delay processing and an advance processing for some reason. Namely, the sensor signal from the humidity sensing portion 12b may not undergo the delay processing or the advance processing or may undergo the delay processing or the advance processing. Therefore, the sensor signal from the low response sensor may not undergo the delay processing or the advance processing or may undergo the delay processing or the advance processing.

The low response sensor may undergo a highly advance processing and may be more responsive than the high response sensor. In such a case, the high response sensor (the temperature sensing portion 12c in this example) may use a response advance processing as a responsiveness adjustment means. In this case, the response advance processing quantity is smaller than the advance processing quantity for the low response sensor.

The airflow meter 100 can apply the same time (value) to difference T described above and the quantity of delaying an output from the high response sensor. To determine whether the same value is assumed, a simulation is performed to determine whether a spike-like error occurs in the absolute humidity. The same value is assumed when no spike-like waveform (error) occurs. The same value is not assumed when a spike-like error occurs. When the maximum value of the spike-like waveform is smaller than a specified value, the same value is not assumed but approximately the same value or an allowable value is taken.

As above, a responsiveness adjustment value is also selected so as to allow the spike-like error to be smaller than or equal to a specified value in consideration of variations in the sensors. The responsiveness of each sensor is inspected to confirm variations in responsiveness differences. A response adjustment value is then determined. Discrete response differences can be used to reduce variations in absolute humidity errors.

Figure 10:
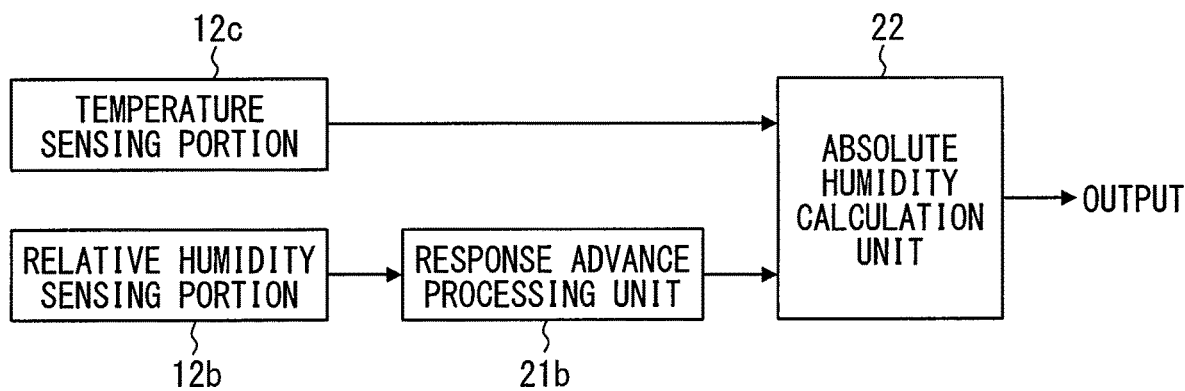
FIG. 10 is a block diagram illustrating a schematic configuration of an airflow meter according to a first modification.

With reference to FIG. 10, the description below explains a first modification as a modification of the first embodiment. As illustrated in FIG. 10, the airflow meter 100 according to the first modification includes a response advance processing unit 21b instead of the response delay processing unit 21a. Otherwise, the first modification is similar to the above-described embodiment.

The response advance processing unit 21b is comparable to an "advance adjustment unit" and is supplied with a sensor signal from the humidity sensing portion 12b as illustrated in FIG. 10. The response advance processing unit 21b advances output from the low response humidity sensing portion 12b and reconciles change-behaviors of output from the temperature sensing portion 12c and the humidity sensing portion 12b in response to a temperature change in the intake air. The response advance processing unit 21b can advance an output based on the software, for example.

When the intake air temperature changes, it is possible to ensure the state of using the same-temperature intake air as a detection target even if the temperature sensing portion 12c differs from the humidity sensing portion 12b in the responsiveness. In other words, the response advance processing unit 21b can reconcile behaviors of output from the temperature sensing portion 12c and the humidity sensing portion 12b both differing in the responsiveness.

The response advance processing unit 21b may be provided for the temperature sensing portion 12c or the circuit chip 50. The response advance processing unit 21b may be provided between the temperature sensing portion 12c and the circuit chip 50. The airflow meter 100 just needs to have the function that advances output from a low response sensing portion and reconciles change-behaviors of output from the temperature sensing portion 12c and the humidity sensing portion 12b in response to a temperature change in the intake air.

As illustrated in FIG. 10, the absolute humidity calculation unit 22 is supplied with a humidity signal from the humidity sensing portion 12b via the response advance processing unit 21b and is supplied with a temperature signal from the temperature sensing portion 12c without using the response advance processing unit 21b. Similarly to the above-described embodiment, the absolute humidity calculation unit 22 acquires the absolute humidity of the intake air from the temperature signal and the relative humidity signal. The airflow meter 100 according to the first modification can provide the effect similar to the above-described embodiment.

In terms of the sensor signal from the high response sensor, the object of the present disclosure is to reconcile change-behaviors of output from the high response sensor and the low response sensor in response to a change the air state. The sensor signal from the high response sensor may undergo at least one of the delay processing and an advance processing for some reason. Therefore, the sensor signal from the high response sensor may not undergo the delay processing or the advance processing or may undergo the delay processing or the advance processing.

When the high response sensor undergoes a highly delay processing and may be less responsive than the low response sensor, the low response sensor may use a response delay processing as a responsiveness adjustment means. In this case, the response delaying quantity is smaller than the delay processing quantity for the high response sensor.

The airflow meter 100 can apply the same time (value) to difference T described above and the quantity of advancing an output from the low response sensor. As above, to determine whether the same value is assumed, a simulation is performed to determine whether a spike-like error occurs in the absolute humidity. As above, it is also possible to determine whether a spike-like waveform occurs and to determine whether the same value is assumed. Variations can be reduced as described above.

The first embodiment has been described. However, the present disclosure is not limited to the above-described embodiment and can be variously modified without departing from the spirit and scope of the disclosure. The description below explains second through fourth embodiments and modifications as other embodiments. The above-described embodiment and the other embodiments and modifications are available not only independently but also in an appropriate combination. The present disclosure is not limited to the combinations described in the embodiments but is available as various combinations.

Second Embodiment

Figure 11:
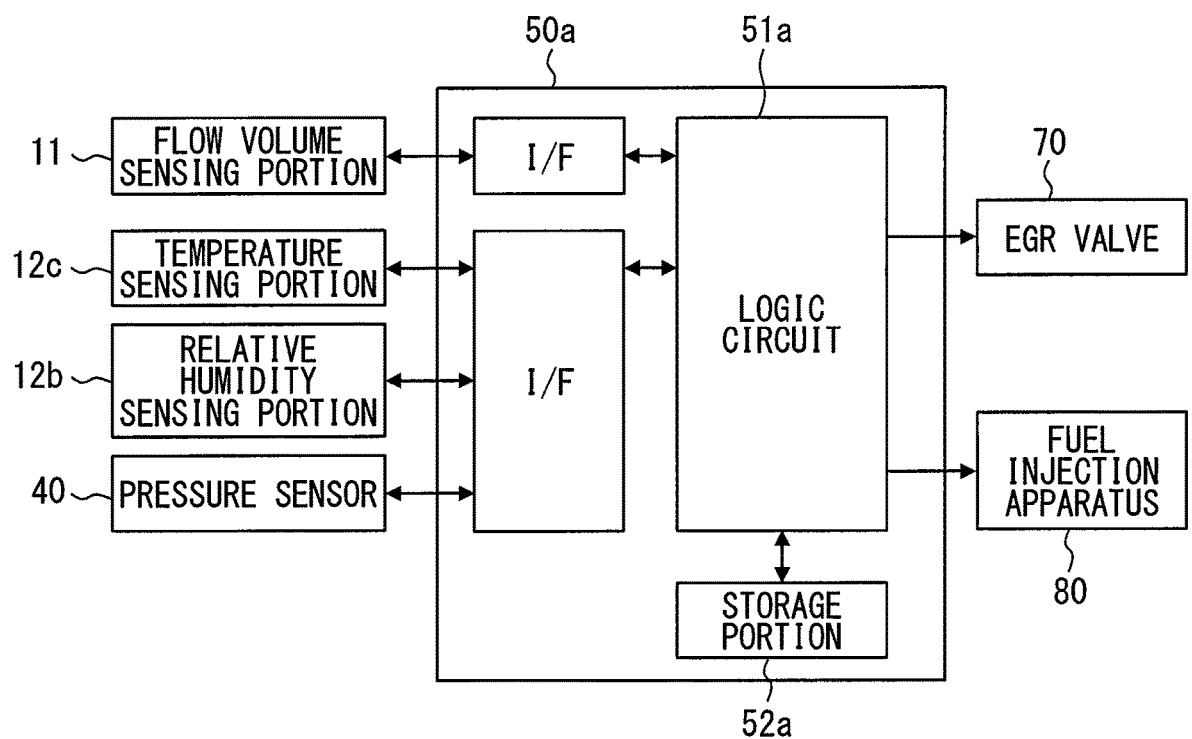
FIG. 11 is a block diagram illustrating a schematic configuration of a system including an airflow meter according to a second embodiment.
Figure 12:
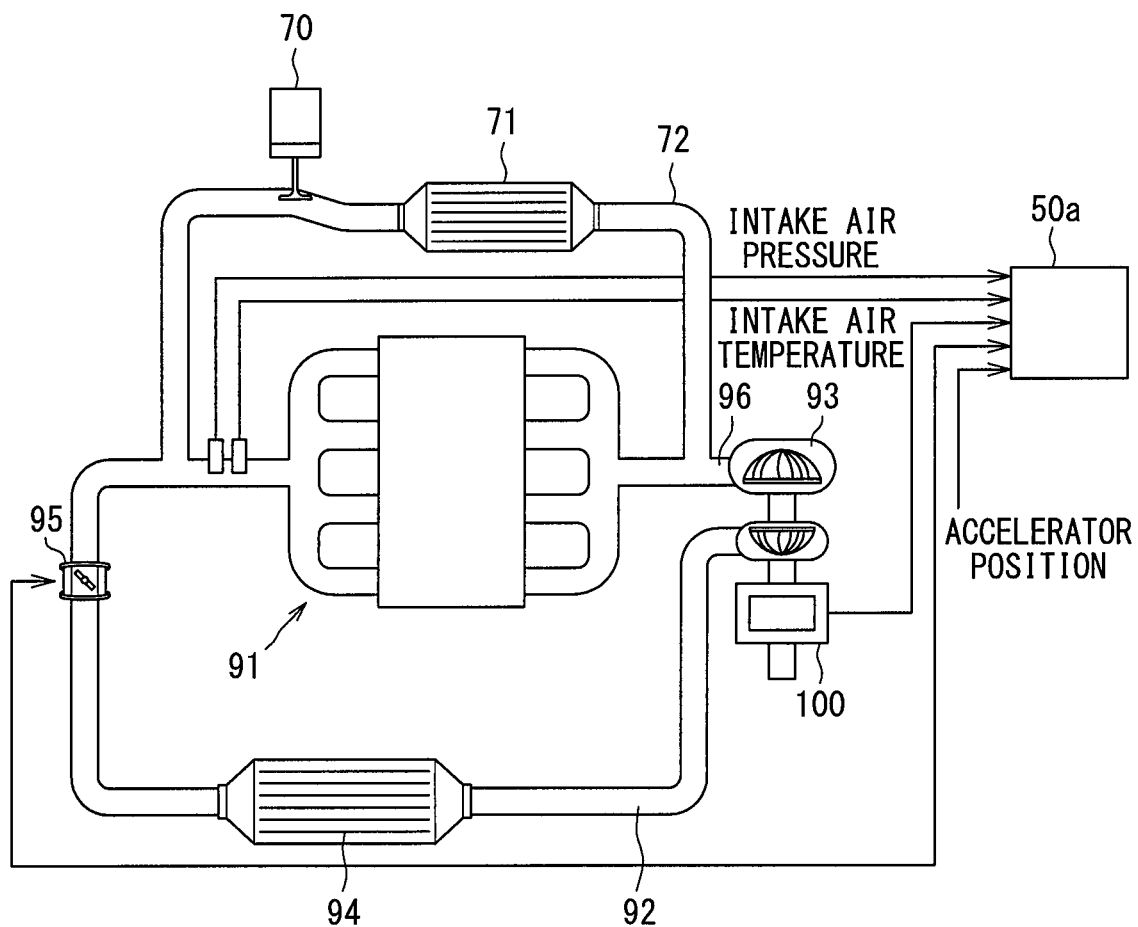
FIG. 12 is a diagram illustrating a schematic configuration of an EGR system mounted with the airflow meter according to the second embodiment.

With reference to FIGS. 11 and 12, the description below explains the second embodiment. As illustrated in FIGS. 11 and 12, the airflow meter 100 according to the second embodiment is applied to an EGR system. For example, the ECU 50a includes an I/F, a logic circuit 51a, and a storage portion 52a and electrically connects with an EGR valve 70 and a fuel injection apparatus 80. The ECU 50a is supplied with signals representing an intake air pressure, an intake air temperature, and an accelerator position.

As illustrated in FIG. 12, the EGR system is a well-known technology including the EGR valve 70, an EGR cooler 71, an EGR path 72, an engine 91, an intake air path 92, a turbocharger 93, an intercooler 94, a throttle valve 5, and an exhaust path 96.

The EGR system can reduce the amount of heat generation by mixing the intake air with combustion gas and decreasing the oxygen concentration of the air supplied to a combustion chamber. The intake air quantity is unchanged and the combustion temperature decreases, making it possible to suppress the generation of NOx. However, a decrease in the combustion temperature hinders re-combustion of the soot and accordingly increases an exhaust force of the soot. There is a trade-off between NOx and the soot, requiring an optimal EGR control.

The EGR valve mainly controls the mixed quantity of combustion gas. In the EGR system, the airflow meter 100 measures the fresh air quantity, calculates the intake air mass of the engine based on engine states (such as speed and pressure), and calculates an EGR ratio (combustion gas divided by intake air mass). However, a system without the airflow meter approximates an EGR ratio based on an engine state and an EGR valve position. Therefore, the fresh air quantity needs to be highly accurately measured in order to highly accurately control the EGR ratio. The EGR system enables a gasoline engine to open a throttle to a greater extent under the condition of any requested output, making it possible to reduce a pumping loss.

An engine burns a sulfur content in the fuel to generate $SO_2$ (sulfur dioxide). The $SO_2$ melts into moisture in the exhaust gas to generate sulfuric acid. As an issue of the EGR system, the sulfuric acid corrodes a cylinder wall, a piston ring, or an injector nozzle. Due to this issue, the EGR system needs to suppress an EGR gas flow volume within a range smaller than an EGR gas flow volume requested to reduce NOx or improve the fuel economy, namely, within a range capable of suppressing the corrosion.

The EGR system can find the amount of moisture in the exhaust gas by measuring the absolute humidity, making it possible to increase an EGR suppression limit. The ECU 50a adjusts the EGR gas flow volume in accordance with a change in the absolute humidity of the intake air. The airflow meter 100 outputs the absolute humidity acquired from the absolute humidity calculation unit 22 to the ECU 50a.

As above, the airflow meter 100 can highly accurately acquire the absolute humidity of the intake air. The airflow meter 100 outputs the absolute humidity to the ECU 50a, enabling the ECU 50a to highly accurately control the EGR. Therefore, the airflow meter 100 can reduce fuel consumption, the amount of exhaust gas, and the water condensation in the exhaust gas. The airflow meter 100 can reduce the water condensation in the exhaust gas and therefore can also reduce damage to the injector.

Figure 13:
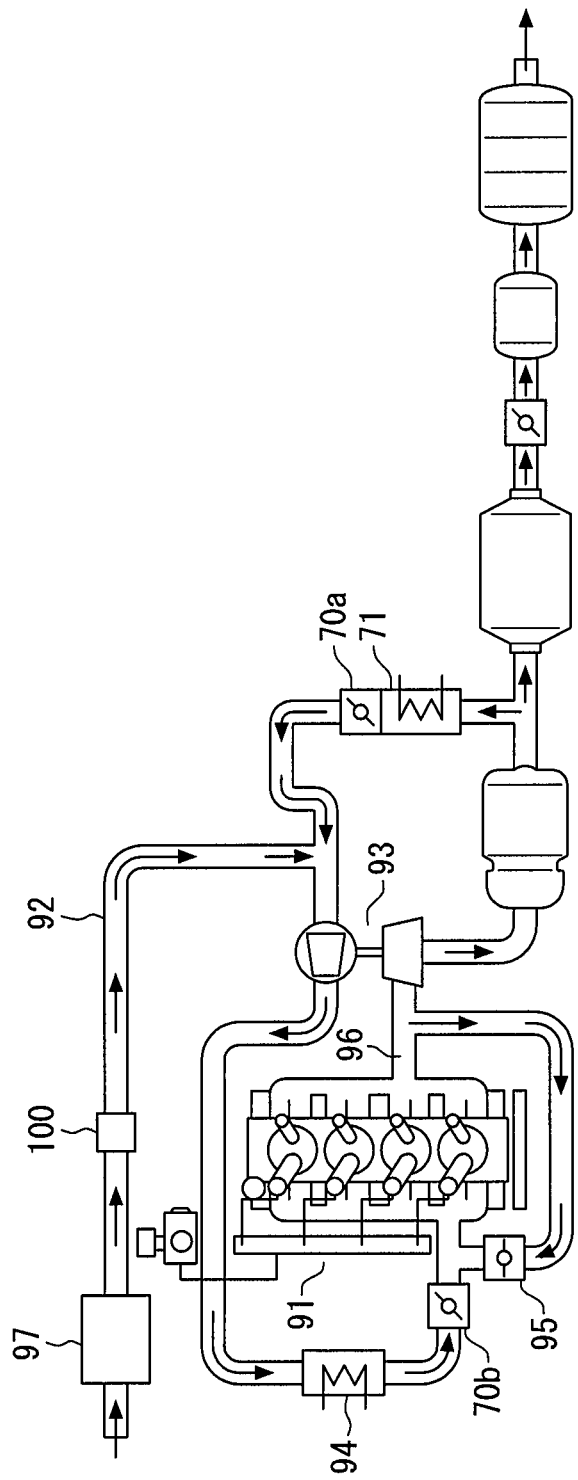
FIG. 13 is a diagram illustrating a schematic configuration of an EGR system mounted with an airflow meter according to a second modification.

With reference to FIG. 13, the description below explains a second modification as a modification of the second embodiment. The airflow meter 100 according to the second modification can be applied to an EGR system as illustrated in FIG. 11. The EGR system according to the second modification differs from the above-described EGR system in that a low-pressure EGR valve 70a, a high-pressure EGR valve 70b, and an air filter 97 are included. This EGR system includes a low-pressure EGR and a high-pressure EGR according to a well-known technology. The airflow meter 100 according to the third modification can provide the effect similar to the second embodiment.

Third Embodiment

The third embodiment will be described with reference to FIG. 14. The airflow meter 100 according to the third embodiment is applied to an example where the humidity sensing portion 12b is more responsive than the temperature sensing portion 12c. According to the present embodiment, the humidity sensing portion 12b can be assumed to be a high response sensor and the temperature sensing portion 12c can be assumed to be a low response sensor.

Figure 14:
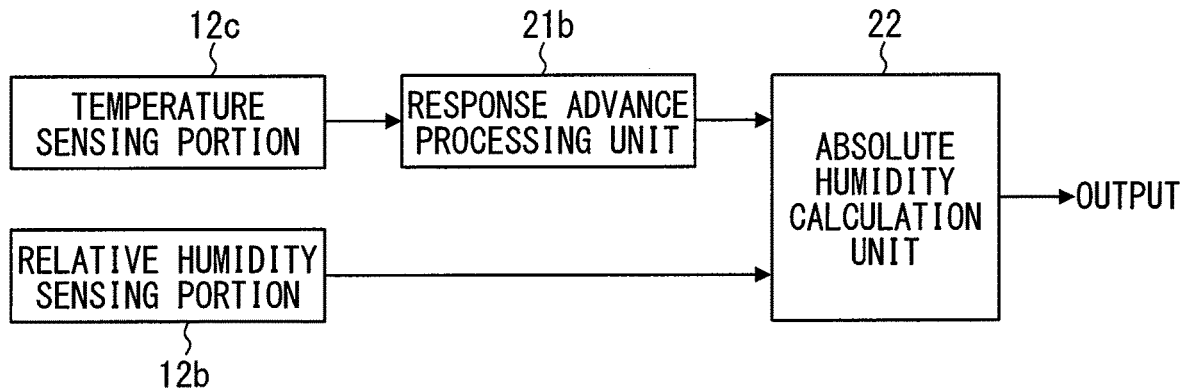
FIG. 14 is a block diagram illustrating a schematic configuration of an airflow meter according to a third embodiment.

As illustrated in FIG. 14, the airflow meter 100 according to the third embodiment includes the response advance processing unit 21b placed between the temperature sensing portion 12c and the absolute humidity calculation unit 22. The airflow meter 100 according to the third embodiment does not include the response advance processing unit 21b between the humidity sensing portion 12b and the absolute humidity calculation unit 22. The airflow meter 100 according to the third embodiment can provide the effect similar to the first embodiment.

Figure 15:
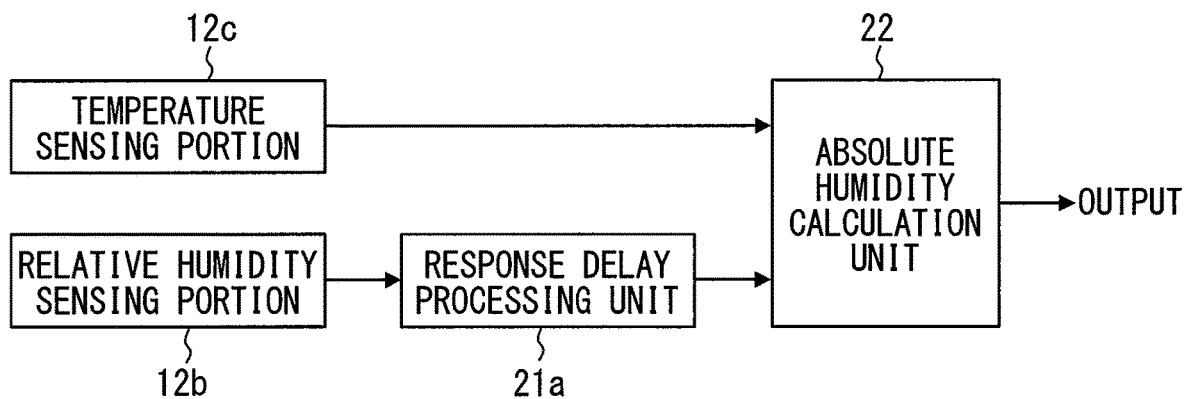
FIG. 15 is a block diagram illustrating a schematic configuration of an airflow meter according to a third modification.

With reference to FIG. 15, the description below explains a third modification as a modification of the third embodiment. As illustrated in FIG. 15, the airflow meter 100 according to the third modification replaces the response advance processing unit 21b with the response delay processing unit 21a. Otherwise, the third modification is similar to the third embodiment.

As illustrated in FIG. 15, the airflow meter 100 according to the third modification includes the response delay processing unit 21a between the humidity sensing portion 12b and the absolute humidity calculation unit 22. The airflow meter 100 according to the third modification does not include the response delay processing unit 21a between the temperature sensing portion 12c and the absolute humidity calculation unit 22. The airflow meter 100 according to the third modification can provide the effect similar to the third embodiment.

Fourth Embodiment

Figure 16:
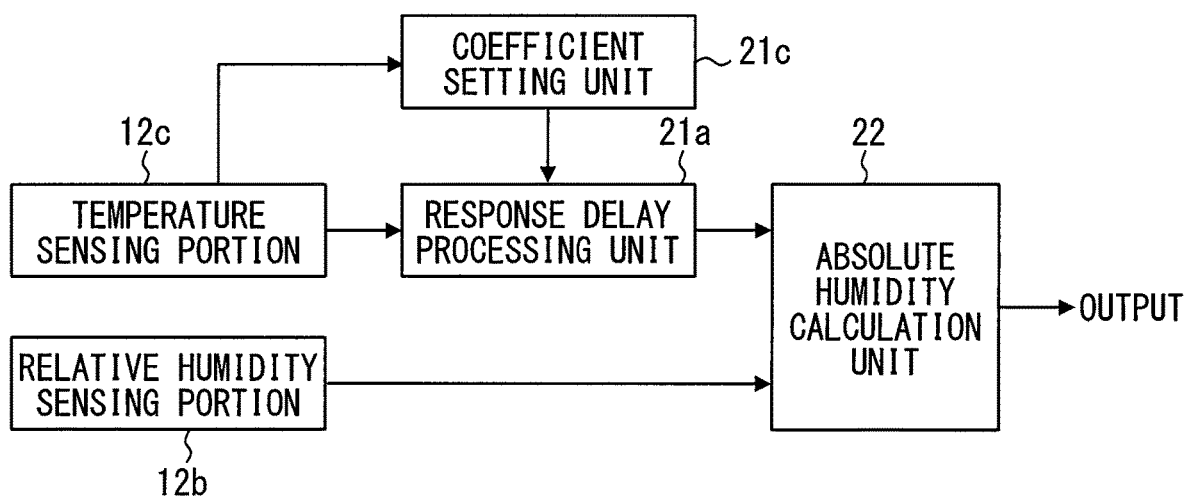
FIG. 16 is a block diagram illustrating a schematic configuration of an airflow meter according to a fourth embodiment.

The fourth embodiment will be described with reference to FIGS. 16 and 17. Similarly to the first embodiment, the airflow meter 100 according to the fourth embodiment is applied to an example where the temperature sensing portion 12c is more responsive than the humidity sensing portion 12b. Unlike the first embodiment, the airflow meter 100 according to the fourth embodiment includes a coefficient setting unit 21c that provides a delay coefficient for the response delay processing unit 21a to delay an output based on a temperature signal output from the temperature sensing portion 12c.

As illustrated in FIG. 17, the humidity sensing portion 12b varies the responsiveness to detect the relative humidity depending on the intake air temperature. When the intake air temperature is high rather than low, the humidity in the humidity sensitive film diffuses rapidly and the humidity sensing portion 12b increases the responsiveness.

As illustrated in FIG. 17, the coefficient setting unit 21c provides a delay coefficient that delays output from the temperature sensing portion 12c to a greater extent when the intake air temperature is low rather than high based on the temperature signal. Therefore, the response delay processing unit 21a delays output from the temperature sensing portion 12c when the intake air temperature is low rather than high. In other words, the response delay processing unit 21a decreases the extent to delay output from the temperature sensing portion 12c when the intake air temperature is high rather than low.

The delay coefficient can be found by using equation 1, for example.

$$\text{Taft}(n)=\text{Taft}(n-1)+(\text{Tbef}(n)-\text{Taft}(n-1))\times\text{Par} \qquad \text{equation 1}$$

Symbol Taft denotes the temperature after the delay processing. Symbol Tbef denotes the temperature output from the temperature sensing portion 12c. Symbol Par denotes the delay coefficient. Value Par is smaller than 1 during the delay processing.

The coefficient setting unit 21c provides a delay coefficient appropriate for the acquired temperature signal by referencing a map associating the temperature signal and the delay coefficient, for example.

The airflow meter 100 according to the fourth modification can provide the effect similar to the first embodiment. The airflow meter 100 according to the fourth embodiment can reconcile change-behaviors of output from the temperature sensing portion 12c and the humidity sensing portion 12b more accurately than a case where no delay coefficient is used. Therefore, the airflow meter 100 can acquire the absolute humidity more accurately than a case where no delay coefficient is used.

As illustrated in FIG. 17, the relative humidity sensor varies the responsiveness to detect the relative humidity depending on not only the intake air temperature but also the flow rate of the intake air. The temperature sensor varies the responsiveness to detect the temperature depending on the flow rate of the intake air. The intake air at a high flow rate rapidly ventilates the air of atmosphere where the humidity sensor is placed. In this case, the humidity sensing portion 12b increases the responsiveness. The intake air at a high flow rate causes the temperature sensing portion 12c to be highly responsive because the temperature sensing portion 12c reacts to the temperature based on the airflow. In FIG. 17, HIGH signifies a high flow rate and LOW signifies a low flow rate.

The coefficient setting unit 21c is capable of acquiring a flow rate signal representing the flow rate of the intake air. The coefficient setting unit 21c provides a delay coefficient that delays output from the temperature sensing portion 12c when an intake air rate is low rather than high. Therefore, the response delay processing unit 21a decreases the extent of delaying output from the temperature sensing portion 12c when the flow rate of the intake air is high rather than low. The airflow meter 100 can thereby highly accurately acquire the absolute humidity similarly to the case of providing a delay coefficient based on the temperature.

The airflow meter 100 according to the fourth embodiment can increase the responsiveness of calculating the absolute temperature more highly than the first embodiment. The airflow meter 100 according to the fourth embodiment can decrease a time lag before the absolute temperature is calculated, increasing the accuracy of calculating the absolute temperature. The sensor is sure to contain a response delay. Therefore, the configuration of performing the advance processing can approximate to the absolute humidity without a response delay.

The coefficient setting unit 21c may provide an advance coefficient used for the response advance processing unit 21b to advance an output. In this case, the coefficient setting unit 21c provides an advance coefficient based on the concept similar to the case of providing a delay coefficient.

The advance coefficient can be found by using equation 2, for example.

$$\text{Taft}(n) = \text{Tbef}(n-1) + (\text{Tbef}(n) - \text{Tbef}(n-1)) \times \text{Par} \qquad \text{equation 2}$$

Symbol Par denotes the advance coefficient. Value Par is larger than 1 during the advance processing.

The airflow meter 100 can thereby highly accurately acquire the absolute humidity similarly to the case of providing a delay coefficient based on the temperature.

The present disclosure has been described with reference to the embodiments but is not limited to the embodiments and structures. The present disclosure covers various modification examples and modifications within a commensurate scope. In addition, the category or the scope of the idea of the present disclosure covers various combinations or forms and moreover the other combinations or forms including only one element or more or less in the former.

The invention claimed is:

1. An absolute humidity sensor comprising:
a temperature sensor placed in an environment allowing air to flow and configured to output a temperature signal as a sensor signal corresponding to temperature of air;
a relative humidity sensor placed in the environment and configured to output a relative humidity signal as a sensor signal corresponding to relative humidity of air;
an absolute humidity acquisition unit configured to acquire absolute humidity of air from the temperature signal and the relative humidity signal, wherein the temperature sensor differs from the relative humidity sensor in responsiveness when the temperature of air changes; and
a delay adjustment unit configured
to delay an output from one of the temperature sensor and the relative humidity sensor, which is a high response sensor having a higher responsiveness, and
to reconcile change-behaviors of the output from the temperature sensor and the output from the relative humidity sensor in response to a temperature change in air, wherein
the absolute humidity acquisition unit is configured to acquire the absolute humidity based on the sensor signal from an other of the temperature sensor and the relative humidity sensor, which is a low response sensor having a lower responsiveness, and the sensor signal, which is from the high response sensor and delayed in the delay adjustment unit.

2. The absolute humidity sensor according to claim 1, comprising:
a coefficient setting unit configured
to acquire a flow rate signal representing a flow rate of air and
to set a delay coefficient for the delay adjustment unit to delay the output from the high response sensor based on at least one of the flow rate signal, the temperature signal, and a pressure signal.

3. An absolute humidity sensor comprising:
a temperature sensor placed in an environment allowing air to flow and configured to output a temperature signal as a sensor signal corresponding to temperature of air;
a relative humidity sensor placed in the environment and configured to output a relative humidity signal as a sensor signal corresponding to relative humidity of air;
an absolute humidity acquisition unit configured to acquire absolute humidity of air from the temperature signal and the relative humidity signal, wherein the temperature sensor differs from the relative humidity sensor in responsiveness when the temperature of air changes; and
an advance adjustment unit configured
to advance an output from one of the temperature sensor and the relative humidity sensor, which is a low response sensor having a lower responsiveness, and
to reconcile change-behaviors of the output from the temperature sensor and the output from the relative humidity sensor in response to a temperature change in air, wherein
the absolute humidity acquisition unit is configured to acquire the absolute humidity based on the sensor signal from an other of the temperature sensor and the relative humidity sensor, which is a high response sensor having a higher responsiveness, and the sensor signal, which is from the low response sensor and advanced in the advance adjustment unit.

4. The absolute humidity sensor according to claim 3, further comprising:
a coefficient setting unit configured
to acquire a flow rate signal representing a flow rate of air and
to set an advance coefficient for the advance adjustment unit to advance output from the low response sensor based on at least one of the flow rate signal, the temperature signal, and a pressure signal.

5. The absolute humidity sensor according to claim 1, further comprising:
a flow volume sensor configured to output a flow volume signal as a sensor signal representing a flow volume of air; and
a correction portion configured to correct the flow volume signal by using the absolute humidity acquired by the absolute humidity acquisition unit.

6. The absolute humidity sensor according to claim 1, wherein
the temperature sensor and the relative humidity sensor are placed in an environment to allow intake air to flow into an internal combustion engine as the environment allowing air to flow, and
the absolute humidity sensor configured to output the absolute humidity acquired by the absolute humidity acquisition unit to a control apparatus configured to adjust an EGR gas flow volume in accordance with a humidity change in the intake air.

7. An absolute humidity sensor comprising:
a temperature sensor placed in an environment allowing air to flow and configured to output a temperature signal as a sensor signal corresponding to temperature of air;
a relative humidity sensor placed in the environment and configured to output a relative humidity signal as a sensor signal corresponding to relative humidity of air, wherein
the temperature sensor differs from the relative humidity sensor in responsiveness when the temperature of air changes,
one of the temperature sensor and the relative humidity sensor is a high response sensor having a higher responsiveness, and
an other of the temperature sensor and the relative humidity sensor is a low response sensor having a lower responsiveness,
the absolute humidity sensor further comprising:
a processor configured to execute instructions to perform:
reconciling change-behaviors of the sensor signal from the temperature sensor and the sensor signal from the relative humidity sensor in response to a temperature change in air by delaying the sensor signal from the high response sensor or by advancing the sensor signal from the low response sensor; and
acquiring absolute humidity of air based on the reconciled sensor signals.

\* \* \* \* \*